(12) United States Patent
Shen et al.

(10) Patent No.: US 12,199,231 B2
(45) Date of Patent: Jan. 14, 2025

(54) NEGATIVE ELECTRODE PLATE AND SECONDARY BATTERY

(71) Applicant: CONTEMPORARY AMPEREX TECHNOLOGY (HONG KONG) LIMITED, Hong Kong (CN)

(72) Inventors: Yuliang Shen, Ningde (CN); Meng Kang, Ningde (CN); Jiazheng Wang, Ningde (CN); Libing He, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 54 days.

(21) Appl. No.: 17/519,601

(22) Filed: Nov. 5, 2021

(65) Prior Publication Data

US 2022/0059864 A1 Feb. 24, 2022

Related U.S. Application Data

(62) Division of application No. 16/282,537, filed on Feb. 22, 2019, now abandoned.

(30) Foreign Application Priority Data

Aug. 21, 2018 (CN) .......................... 201810953623.9

(51) Int. Cl.
*H01M 10/04* (2006.01)
*H01M 4/04* (2006.01)

(52) U.S. Cl.
CPC ......... *H01M 10/049* (2013.01); *H01M 4/045* (2013.01); *H01M 10/045* (2013.01)

(58) Field of Classification Search
CPC ... H01M 10/049; H01M 4/045; H01M 10/045
See application file for complete search history.

(56) References Cited

U.S. PATENT DOCUMENTS

| | | | |
|---|---|---|---|
| 11,283,061 B2 | 3/2022 | Shen et al. | |
| 2014/0057166 A1 | 2/2014 | Yokoyama et al. | |
| 2019/0097263 A1* | 3/2019 | Azami | H01M 4/483 |
| 2019/0131658 A1* | 5/2019 | Sasaki | H01G 11/62 |

FOREIGN PATENT DOCUMENTS

| | | |
|---|---|---|
| CN | 101107734 | 1/2008 |
| CN | 101107734 A | 1/2008 |
| CN | 101710058 A | 5/2010 |
| CN | 102779990 A | 11/2012 |
| CN | 108140825 A | 6/2018 |
| CN | 108844878 A | 11/2018 |
| EP | 2306559 A1 | 4/2011 |
| EP | 2523241 A1 | 11/2012 |
| EP | 2306559 A4 | 9/2014 |
| EP | 3336938 A1 | 6/2018 |

OTHER PUBLICATIONS

The First Office Action for Chinese Application No. 201810953623.9, dated Sep. 3, 2020, 13 pages.
The Second Office Action for Chinese Application No. 201810953623.9, dated Dec. 18, 2020, 8 pages.
The EESR for European Application No. 19158886.2, dated Sep. 12, 2019, 7 pages.
The Third party observations for European Application No. 19158886.2, dated Jun. 1, 2022, 11 pages.
The First Office Action for European Application No. 19158886.2, dated Mar. 22, 2022, 4 pages.
Journal article titled "Electrodeposition of Nickel Hexacyanoferrate for the Estimation of the Electroactive Area in Porous Three-Dimensional Film Electrode", Rare Metal Materials and Engineering, vol. 42, Issue 4, dated Apr. 2013, 5 pages.
A technical article titled "Wet or liquid dispersion method development for laser diffraction particle size measurements (2013)" by Malvern Instruments Limited, 10 pages.
The Non-fianl Office Action for U.S. Appl. No. 16/282,537, dated Apr. 29, 2020, 17 pages.
The Fianl Office Action for U.S. Appl. No. 16/282,537, dated Sep. 10, 2020, 8 pages.
The Advisory Action for U.S. Appl. No. 16/282,537, dated Dec. 2, 2020, 4 pages.
The Second Non-fianl Office Action for U.S. Appl. No. 16/282,537, dated Apr. 15, 2021, 8 pages.
The Second Fianl Office Action for U.S. Appl. No. 16/282,537, dated Jul. 8, 2021, 13 pages.
The Second Advisory Action for U.S. Appl. No. 16/282,537, dated Sep. 16, 2021, 4 pages.
Ma Xuli et al., "Electrodeposition of Nickel Hexacyanoferrate for the Estimation of the Electroactive Area in Porous Three-Dimensional Film Electrode", Rare Metal Materials and Engineering, dated Apr. 2013, 5 Pages.
The extended European search report dated Sep. 12, 2019 for European application No. 19158886.2, 7 pages.
The first Official Action and search report dated Sep. 3, 2020 for Chinese application No. 201810953623.9, 13 pages.

* cited by examiner

*Primary Examiner* — Brian R OHara
*Assistant Examiner* — Emily Elizabeth Freeman
(74) *Attorney, Agent, or Firm* — East IP P.C.

(57) ABSTRACT

The present application relates to a negative electrode plate and a secondary battery. Specifically, the present application provides a negative electrode plate comprising a negative electrode current collector and an negative electrode film coated on at least one surface of the negative electrode current collector and containing the negative active material, wherein the negative electrode plate satisfies $0.6 \leq 0.7 \times P \times (D90-D10)/D50 + B/3 \leq 8.0$, wherein P refers to the porosity of the negative electrode film; B refers to the active specific surface area of the negative electrode film, and the unit thereof is $m^2/g$; D10 refers to the particle size corresponding to the cumulative volume percentage of the negative active material reaching 10%, D90 refers to the particle size corresponding to the cumulative volume percentage of the negative active material reaching 90%, and D50 refers to the particle size corresponding to the cumulative volume percentage of the negative active material reaching 50%.

13 Claims, No Drawings

NEGATIVE ELECTRODE PLATE AND SECONDARY BATTERY

CROSS-REFERENCE TO RELATED APPLICATION

This application is a divisional application of U.S. patent application Ser. No. 16/282,537, filed on Feb. 22, 2019, which claims priority to Chinese Patent Application No. 201810953623.9 filed on Aug. 21, 2018. The aforementioned patent applications are hereby incorporated by reference in their entireties.

TECHNICAL FIELD

The present application belongs to the field of electrochemical technology, and more particularly to a negative electrode plate for a secondary battery and the corresponding secondary battery.

BACKGROUND

New energy vehicles represent the direction of the development of the world's automotive industry. As a new high-voltage, high-energy-density rechargeable battery, the secondary battery is widely used in new energy vehicles because of its light weight, high energy density, no pollution, no memory effect, and long service life.

However, longer charging time is one of the important factors limiting the rapid spread of new energy vehicles. From the technical principle, the core of fast charging technology is to enhance the moving speed of ions between positive and negative electrodes by adjusting the chemical system and optimizing the design. If the negative electrode cannot withstand large current charging, metal will precipitate during fast charging, and a large amount of by-products will be generated on the surface of the negative electrode, which will affect the cycle and safety performance of the battery. Therefore, the key design of the fast charging technology for secondary battery lies in the negative active material and its electrode plate design. At present, most fast charging batteries guarantee the fast charging capability of the batteries at the expense of energy density.

In view of the above, it is necessary to provide a secondary battery that can solve the above problems and has the characteristics of long cycle, high energy density, and fast charging.

SUMMARY

It is an object of the present application to provide a negative electrode plate for a battery having the characteristics of long cycle life and fast charging.

It is a further object of the present application to provide a secondary battery that combines the characteristics of high energy density, fast charging, and long cycle life.

In order to achieve the above object, a first aspect of the present application provides a negative electrode plate comprising a negative electrode current collector and an negative electrode film coated on at least one surface of the negative electrode current collector and containing a negative active material, wherein the negative electrode plate satisfies $0.6 \leq 0.7 \times P \times (D90-D10)/D50 + B/3 \leq 8.0$, wherein P refers to the porosity of the negative electrode film;

wherein B refers to the active specific surface area of the negative electrode film, and the unit thereof is $m^2/g$;

wherein D10 refers to the particle size corresponding to the cumulative volume percentage of the negative active material reaching 10%, D90 refers to the particle size corresponding to the cumulative volume percentage of the negative active material reaching 90%, and D50 refers to the particle size corresponding to the cumulative volume percentage of the negative active material reaching 50%, i.e., the median particle size of the volume distribution, the units of D10, D90 and D50 are all μm.

In another aspect, the present application also provides a secondary battery comprising the negative electrode plate according to the first aspect of the present application.

With respect to the prior art, the present application has at least the following beneficial effects:

In the design of the battery, the reasonable matching of the particle size distribution of the negative active material, the porosity of the negative electrode film and the active specific surface area of the negative electrode film enables the three values to satisfy a specific relationship, so that the secondary battery can have the properties of long cycle life, high energy density and fast charging.

DETAILED DESCRIPTION

The negative electrode plate and the secondary battery according to the present application will be described in detail below.

First, the negative electrode plate according to a first aspect of the present application, comprises a negative electrode current collector and a negative electrode film coated on at least one surface of the negative electrode current collector and containing a negative active material, wherein the negative electrode plate satisfies the following Formula I:

$$0.6 \leq 0.7 \times P \times (D90-D10)/D50 + B/3 \leq 8.0 \quad \text{Formula I)}$$

Through extensive research, the inventors have found that certain parameters of the negative active material and the negative electrode film have different degrees of influence on the performance of the battery; when designing the electrode plate, if these influence degrees can be comprehensively considered and a special design is made for these parameters, it is possible to obtain a secondary battery that combines the characteristics of long cycle life, high energy density, and fast charging.

Theoretically, the electrochemical process of the negative electrode plate occurs when charging and can be roughly divided into 3 steps:

1) liquid phase conduction (including liquid phase diffusion and electromigration) of ions inside the porous electrode of the negative electrode;
2) charge exchange of ions on the surface of the negative active material;
3) solid phase conduction of ions inside the negative active material particles.

Through extensive research, it has been found that the rate performance and energy density of the battery are closely related to the particle size, morphology and particle size distribution of the negative active material. Considering the solid phase conduction ability inside the negative active material particles, generally, the smaller the particle size of the negative active material is, the smaller the diffusion path of the active ions inside the particles will be, which is more advantageous for high-rate charging, but at the same time, the packed density of the electrode plate is lowered and the energy density is also significantly reduced; and the larger the particle size of the negative active material is, the more advantageous it is to increase the specific capacity of the negative active material, thereby effectively increasing the energy density of the battery. Therefore, it is very important to design the particle size distribution of the negative active material. The reasonable matching of the size particles can achieve the high energy density and fast charging performance of the battery.

Considering the liquid phase conductivity ability, the larger the porosity of the negative electrode film is, the better the wettability of the electrolyte will be, and the higher the liquid phase diffusion rate is. In high-rate charging, the ions are more easily reduced, thereby avoiding the formation of metal dendrites and improving the ability of fast charging. If the porosity is too large, the energy density of the battery will be significantly influenced; if the porosity is too small, it is not conducive to the wettability of the electrolyte, and the diffusion rate of the liquid phase is affected, thereby affecting the cycle performance of the battery.

The active specific surface area of the negative electrode film can accurately characterize the number of the active sites of the negative electrode plate that participate in the reaction during charging and discharging. The larger the active specific surface area of the negative electrode film is, the more the active sites in the negative electrode film will be, the faster the charge exchange between the active ions and the electrons is, and the better the dynamic performance of the battery will be. However, when the active specific surface area of the negative electrode film is too large, the electrochemical activity of the negative electrode film is too high, and the side reaction between the negative electrode film and the electrolyte is excessive, resulting in that the film formed on the surface of the negative electrode plate is too thick, so that when the active ions pass through the SEI film on the surface of the negative electrode to enter the negative electrode film, the impedance is too large, and the dynamic performance of the battery is decreased, meanwhile, the irreversible capacity loss is also caused, which affects the service life of the battery; when the active specific surface area of the negative electrode plate is too small, the number of the active sites in the negative electrode sheet is less, the charge exchange between the active ions and the electrons is slower, and the dynamic performance of the battery is poor.

It should be noted that the "active specific surface area of the negative electrode film" of the present application is different from the "specific surface area of the negative electrode film" in the prior art. At present, the specific surface area of the negative electrode membrane in the prior art is mostly obtained by a gas adsorption method, which only indicates the physical adsorption specific surface area of the negative electrode film, and does not accurately reflect the active specific surface area of the negative electrode film actually participating in the reaction.

Only optimizing the particle matching, optimizing the porosity, and optimizing the specific surface area of the negative electrode plate can improve the performance of the battery to a certain extent, but it has great limitations. The film engineering of the negative electrode needs to comprehensively consider each influence factor and make a reasonable collocation, then it is possible to prepare a battery that meets the needs of customers. Through a large number of experiments, the present application has found that during the design of the battery core, if the particle matching, the film porosity, and the active specific surface area of the film satisfy the above specific relationship, the secondary battery can combine the properties of long life, high energy density, and fast charging.

Preferably, the negative electrode plate satisfies:

$$1.2 \leq 0.7 \times P \times (D90-D10)/D50 + B/3 \leq 4.0 \qquad \text{Formula II)}.$$

In order to further optimize the battery performance, the preferred ranges of parameters in the above relationship are as follows:

Preferably 20%≤P≤60%, more preferably 25%≤P≤45%;

Preferably 1 m$^2$/g≤B≤15 m$^2$/g, more preferably 4 m$^2$/g≤B≤10 m$^2$/g;

Preferably 0.3≤(D90−D10)/D50≤8, more preferably 0.8≤(D90−D10)/D50≤3, where (D90−D10)/D50 may represent the particle size distribution of the negative active material.

Preferably 10 μm≤D90≤60 μm, more preferably 15 μm≤D90≤40 μm.

Preferably 4 μm≤D50≤20 μm, more preferably 5 μm≤D50≤14 μm.

Preferably 1 μm≤D10≤15 μm, more preferably 3 μm≤D10≤10 μm.

The negative active material used in the negative electrode film of the present application may be various negative active materials that are commonly used in the art, and the present application is not particularly limited thereto. For example, the negative active material used in the negative electrode of the present application may be one or more of graphite material, soft carbon, hard carbon, carbon fibers, mesocarbon microbeads, silicon-based material, tin-based material and lithium titanium oxide.

The graphite material may be selected from at least one of artificial graphite and natural graphite. The silicon-based material may be selected from one or more of elemental silicon, silicon oxide compound, silicon carbon composite, and silicon alloy. The tin-based material may be selected from one or more of elemental tin, tin oxide compound, and tin alloy.

In a preferred embodiment, the negative active material comprises a graphite material, wherein based on the total weight of the negative active material, the percentage of the graphite material may be higher than 50%, preferably higher than 60%, 65%, 70%, 75%, 80%, 85%, 90% or 95%, or be about 100%.

In addition, in order to further improve the cycle stability and rate performance of the negative active material, it is the most common and effective method to coat on the surface of the negative active material. For example, the surface coating layer of the negative active material may be one or more of soft carbon, hard carbon, lithium titanium oxide, silicon-based material, conductive carbon, and polymer. The coating material content is from 1% to 20%, preferably from 1% to 10%, based on the coated graphite material.

Methods for preparing these materials are well known and commercially available. Those skilled in the art can make appropriate choices according to the actual environment.

Unless otherwise specified, the various parameters referred to in this specification have the general meaning well-known in the art and can be measured by methods well known in the art. For example, test can be performed in accordance with the methods given in the embodiments of the present application.

The negative electrode plate of the present application can be prepared by a method known in the art. Generally, the materials such as a negative active material and an optional conductive agent (for example, carbon materials such as carbon black and metal particles, etc.), a binder (for example, SBR), and other optional additives (for example, a PTC thermistor material) are mixed together and dispersed in a solvent (for example, deionized water), stirred uniformly and uniformly coated on the negative electrode current collector, and after drying, a negative electrode plate containing the negative electrode film is obtained. A material such as a metal foil or a porous metal plate can be used as the negative electrode current collector. It is preferred to use a copper foil.

Please be noted that when preparing the negative electrode plate, the negative current collector can be coated on both sides or on one side. When the negative electrode current collector is coated on both sides, as long as the film on any one of the sides satisfies the above Formula I, it is considered that such negative electrode plate falls within the scope of the present invention.

The inventors have further found that the following parameters also have a certain effect on the performance of the battery core:

The physical adsorption specific surface area of the negative active material itself has a certain effect on the active specific surface area of the negative electrode film. In general, the active specific surface area of the negative electrode film increases as the physical adsorption specific surface area of the negative electrode active material increases.

Preferably, the negative active material has a specific surface area of from 0.7 $m^2/g$ to 4.2 $m^2/g$; further preferably, the negative active material has a specific surface area of from 1.1 $m^2/g$ to 2.9 $m^2/g$.

The packed density PD of the negative electrode film has a certain effect on the porosity of the negative electrode film. Generally, the larger the packed density of the negative electrode film is, the more severely the pores of the porous electrode are compacted, and the denser the negative electrode film is; therefore, the porosity of the negative electrode film is smaller, so that the negative active material particles are more closely adhered to each other, and the energy density may be higher, but it is not conducive to the wettability of electrolyte, and the diffusion rate of the liquid phase is affected, thereby further affecting the cycle performance of the battery.

Preferably, the packed density PD of the negative electrode film satisfies $0.8 \text{ g/cm}^3 \leq PD \leq 2.0 \text{ g/cm}^3$, preferably $1.0 \text{ g/cm}^3 \leq PD \leq 1.8 \text{ g/cm}^3$.

In general, the smaller the coating weight per unit area (CW) of the negative electrode film is, the better the dynamic performance of the battery will be, but at the same time the lower the energy density of the battery will be. CW has a certain effect on the dynamics and energy density of the battery.

Preferably, the coating weight per unit area (CW) of the negative electrode film is in the range of 2 $mg/cm^2$ to 13 $mg/cm^2$, and further preferably, 5 $mg/cm^2$ to 10 $mg/cm^2$.

In another aspect, the present application also provides a secondary battery comprising the negative electrode plate according to the first aspect of the present application.

The construction and preparation method of the secondary battery of the present application are known per se, except that the negative electrode plate of the present application is used. Generally, the secondary battery is mainly composed of a positive electrode plate, a negative electrode plate, a separator, and an electrolyte, wherein the positive and negative electrode plates are immersed in the electrolyte, and the ions move between the positive and negative electrodes by using the electrolyte as a medium to realize the charging and discharging of the battery. In order to avoid short circuit between the positive and negative electrodes through the electrolyte, it is necessary to separate the positive and negative electrode plate by using a separator. The form of the secondary battery may be, for example, a soft case battery or a battery with an aluminum case.

It is to be noted that the secondary battery according to another aspect of the present application may be a lithium-ion battery, a sodium-ion battery, and any other battery using the negative electrode plate of the first aspect of the invention.

Specifically, when the battery is a lithium-ion battery:

The positive electrode plate comprises a positive electrode current collector and a positive electrode film disposed on the surface of the positive electrode current collector and containing a positive active material, wherein the positive active material may be selected from lithium cobalt oxide, lithium nickel oxide, lithium manganese oxide, lithium nickel manganese oxide, lithium nickel cobalt manganese oxide, lithium nickel cobalt aluminum oxide, transition metal phosphate, and lithium iron phosphate, etc., but the application is not limited to these materials, and other traditionally known materials which can be used as the positive active material for a lithium-ion battery can also be used. These positive active materials may be used alone or in combination of two or more. Preferably, the positive active material may be selected from one or more of $LiCoO_2$, $LiNiO_2$, $LiMnO_2$, $LiMn_2O_4$, $LiNi_{1/3}Co_{1/3}Mn_{1/3}O_2$ (NCM333), $LiNi_{0.5}Co_{0.2}Mn_{0.3}O_2$ (NCM523), $LiNi_{0.6}Co_{0.2}Mn_{0.2}O_2$ (NCM622), $LiNi_{0.8}Co_{0.1}Mn_{0.1}O_2$ (NCM811), $LiNi_{0.5}Co_{0.15}Al_{0.05}O_2$, $LiFePO_4$, and $LiMnPO_4$.

Specifically, when the battery is a sodium-ion battery:

The positive electrode plate comprises a positive electrode current collector and a positive electrode film disposed on the surface of the positive electrode current collector and containing a positive active material, wherein the positive active material may be selected from sodium iron composite oxide ($NaFeO_2$), sodium cobalt composite oxide ($NaCoO_2$), sodium chromium composite oxide ($NaCrO_2$), sodium manganese composite oxide ($NaMnO_2$), sodium nickel composite oxide ($NaNiO_2$), sodium nickel titanium composite oxide ($NaNi_{1/2}Ti_{1/2}O_2$), sodium nickel manganese composite oxide ($NaNi_{1/2}Mn_{1/2}O_2$), sodium iron manganese composite oxide ($Na_{2/3}Fe_{1/3}Mn_{2/3}O_2$), sodium nickel cobalt manganese composite oxide ($NaNi_{1/3}Co_{1/3}Mn_{1/3}O_2$), sodium iron phosphate compound ($NaFePO_4$), sodium manganese phosphate compound ($NaMnPO_4$), sodium cobalt phosphate compound ($NaCoPO_4$), Prussian blue material, and polyanionic material (phosphate, fluorophosphate, pyrophosphate, sulfate), etc., but the present application is not limited to these materials. The present application can also use other conventionally known materials which can be used as positive active materials for a sodium-ion battery. These positive active materials may be used alone or in combination of two or more.

In the battery according to another aspect of the present application, the specific type and composition of the separator and the electrolyte are not particularly limited, and may be selected according to actual needs.

Specifically, the separator may be selected from a polyethylene film, a polypropylene film, a polyvinylidene fluoride film, and a multilayer composite film thereof.

When the battery is a lithium-ion battery, as the non-aqueous electrolyte, a lithium salt solution dissolved in an organic solvent is usually used. The lithium salt is, for example, an inorganic lithium salt such as $LiClO_4$, $LiPF_6$, $LiBF_4$, $LiAsF_6$, or $LiSbF_6$; or an organic lithium salt such as $LiCF_3SO_3$, $LiCF_3CO_2$, $Li_2C_2F_4(SO_3)_2$, $LiN(CF_3SO_2)_2$, $LiC(CF_3SO_2)_3$, $LiC_nF_{2n+1}SO_3$ (n≥2), or the like. The organic solvent used in the non-aqueous electrolyte is, for example, a cyclic carbonate such as ethylene carbonate, propylene carbonate, butylene carbonate or vinylene carbonate; or a chain carbonate such as dimethyl carbonate, diethyl carbonate and methyl ethyl carbonate; or a cyclic ester such as methyl propionate; or a chain ester such as Y-butyrolactone; or a chain ether such as dimethoxyethane, diethyl ether, diethylene glycol dimethyl ether and triethylene glycol dimethyl ether; or a cyclic ether such as tetrahydrofuran and 2-methyltetrahydrofuran; or nitriles such as acetonitrile and propionitrile; or a mixture of these solvents.

Hereinafter, the structure and preparation method of the secondary battery of the present application will be briefly described by using a lithium-ion battery as an example.

First, a positive electrode plate for battery is prepared in accordance with a conventional method in the art. The present application does not limit the positive active material used for the positive electrode plate. Usually, in the above positive active material, it is necessary to add a conductive agent (for example, a carbon material such as carbon black), a binder (for example, PVDF), or the like. Other additives such as PTC thermistor materials may also be added if necessary. These materials are usually mixed and dispersed in a solvent (for example, NMP), uniformly stirred and uniformly coated on a positive electrode current collector, and dried to obtain a positive electrode plate. A material such as a metal foil or a porous metal plate can be used as the positive electrode current collector. Aluminum foil is preferably used.

Then, the negative electrode plate of the present application is prepared as described above.

Finally, the positive electrode plate, the separator, and the negative electrode plate are stacked in order, so that the separator plays the role of isolation between the positive electrode plate and negative electrode plate, and then wound to obtain a bare core; the bare core is placed in the outer package, after drying, the electrolyte is injected, and after vacuum encapsulation, standing, formation, shaping, and the like, a secondary battery is obtained.

Compared with the conventional negative electrode plate, the present application can allow the secondary battery to have long cycle life, high energy density, and fast charging performance. Therefore, it is of great significance for the fields such as new energy vehicles.

Advantageous effects of the present application will be further described below in conjunction with the examples.

Example

The following examples are intended to describe the disclosure of the present invention, and are intended to be illustrative only, and various modifications and changes in the scope of the present disclosure will be apparent to those skilled in the art. All parts, percentages, and ratios reported in the following examples are by weight unless otherwise stated, and all reagents used in the examples are commercially available or synthetically obtained by conventional methods and are directly used without further processing, and the instruments used in the examples are commercially available.

1. Preparation of a Battery for Testing

The batteries of Examples 1-13 and Comparative Examples 1-6 were all prepared as follows:

A) Preparation of Positive Electrode Plate:

The positive active material (see Table 1 for details), conductive agent (Super P), binder (PVDF), etc. were mixed at a ratio of 96:2:2, then the solvent (NMP) was added, and the mixture was stirred under a vacuum stirrer to a uniform and transparent system, to obtain a positive electrode slurry; the positive electrode slurry was uniformly coated on the positive electrode current collector aluminum foil; then the positive electrode current collector coated with the positive electrode slurry was dried at room temperature, and transferred to an oven for drying, and then subjected to cold pressing, slitting and the like. Finally a positive electrode plate was obtained.

B) Preparation of Negative Electrode Plate:

The negative electrode active material (see Table 1 for details), thickener (CMC), binder (SBR), conductive agent (Super P), etc. were mixed at a ratio of 95:2:2:1, and then were mixed with a solvent (deionized water) under a vacuum stirrer to prepare a negative electrode slurry; then the negative electrode slurry was uniformly coated on the negative electrode current collector copper foil, and the negative electrode current collector coated with the negative electrode slurry was dried at room temperature and then transferred to an oven for drying, and then subjected to cold pressing, slitting and the like. Finally a negative electrode plate was obtained.

C) Preparation of Electrolyte:

Ethylene carbonate (EC), ethyl methyl carbonate (EMC), and diethyl carbonate (DEC) were mixed at a volume ratio of 1:1:1, and then the sufficiently dried lithium salt $LiPF_6$ was dissolved at a ratio of 1 mol/L in the mixed organic solvent, to prepare an electrolyte.

D) Preparation of the Separator:

A 12 micron polyethylene film was chosen.

E) Assembly of the Battery:

The positive electrode plate, the separator and the negative electrode plate were stacked in order, so that the separator played the role of isolation between the positive electrode plate and the negative electrode plate, and then the stack was wound to obtain a bare core; the bare cores were placed in the outer packaging shell. The prepared electrolyte was injected into dried bare cores, and the lithium-ion battery was obtained by vacuum packaging, standing, chemical treatment, shaping and the like.

2. Determination of the Parameters of Negative Active Material and Negative Electrode Plate 1) D10, D90, D50 of the Negative Active Material:

Using a laser diffraction particle size distribution measuring instrument (Malvern Mastersizer 3000), the particle size distribution was measured according to the particle size distribution laser diffraction method GB/T19077-2016, and D10, D90, D50 were obtained, and then (D90−D10)/D50 was calculated.

2) Porosity P of Negative Electrode Film:

According to GB/T24586, the gas displacement method was used for measurement. Porosity $P=(V1-V2)/V1*100\%$, where V1 was the apparent volume of the sample and V2 was the true volume of the sample.

3) Active Specific Surface Area B of the Negative Electrode Film:

The negative electrode plate prepared in the examples and the comparative examples was used as a cathode, and the lithium metal sheet was used as an anode, and ferrocene having a concentration of 50 mmol/L was added to the electrolyte (same as the electrolyte used in the preparation of a battery), then assembled into a button half battery. Four parallel samples were scanned at sweep speeds of 0.1 mV/s, 0.3 mV/s, 0.5 mV/s, and 1 mV/s, respectively, to obtain cyclic voltammetry curves at different sweep speeds, which were extracted by using EC-Lab software to obtain the peak current ip of the cyclic voltammetry curve. Taking the square root $\sqrt{v}$ of the sweep velocity v as the abscissa and the peak current ip as the ordinate, a linear graph of the cyclic volt-ampere curve ip vs. $\sqrt{v}$ was obtained, and then the slope K was obtained.

According to the Randles-Sevick equation $i_p=2.69\times 10^5 n^{3/2} Ac\sqrt{D}\sqrt{v}$, as can be seen that the slope was $K=2.69\times 10^5 n^{3/2} Ac\sqrt{D}$, where n was the number of electron transfer, which was related to the molecular type of the probe. Here, n was given a value of 1, c was the concentration of ferrocene, and here c was given a value of 50 mmol/L, and D was the diffusion coefficient of ferrocene, and here D was given a value of $2.1\times10^{-6}$ cm$^2$/s. Thus the active surface area of the negative electrode plate was $A=K/(2.69\times10^5 n^{3/2} c\sqrt{D})$; then the ratio of the active surface area A of the negative electrode film to the weight m of the negative electrode film was calculated, which represented the active specific surface area B of the negative electrode film.

3. Tests for Battery Performances
1) Test for Dynamic Performance

The battery prepared in the examples and the comparative examples was fully charged at x C and fully discharged at 1 C, then repeated 10 times, and then the battery was fully charged at x C, and then the negative electrode plate was disassembled, and the negative electrode was observed whether there was lithium precipitation on the surface of the negative electrode plate or not. If lithium was not precipitated on the surface of the negative electrode, the charging rate x C was again measured in increments of 0.1 C until there was lithium precipitation on the surface of the negative electrode, and the test was stopped. At this time, the charging rate (x−0.1) C was the maximum charging rate of the battery.

2) Test for Cycle Performance

The lithium-ion battery prepared in the examples and the comparative examples was charged at the above maximum charging magnification (x−0.1) C at a temperature of 25° C., discharged at a rate of 1 C, and subjected to a full charge-discharge cycle test until the capacity of the lithium-ion battery was attenuated to 80% of the initial capacity, then the number of cycles was recorded.

3) Test for Actual Energy Density

The lithium-ion battery prepared in the examples and the comparative examples was fully charged at 1 C rate and fully discharged at 1 C rate at 25° C., and the actual discharge energy at this time was recorded; at 25° C., the lithium-ion battery was weighed by using an electronic balance; the ratio of the actual discharge energy of the lithium-ion battery at 1 C to the weight of the lithium-ion battery was the actual energy density of the lithium-ion battery.

When the actual energy density was less than 80% of the expected energy density, the actual energy density of the battery was considered to be very low; when the actual energy density was greater than or equal to 80% of the expected energy density and less than 95% of the expected energy density, the actual energy density of the battery was considered to be low, when the actual energy density was greater than or equal to 95% of the expected energy density and less than 105% of the expected energy density, the actual energy density of the battery was considered to be moderate; when the actual energy density was greater than or equal to 105% of the expected energy density and less than 120% of the expected energy density, the actual energy density of the battery was considered to be high; when the actual energy density was more than 120% of the expected energy density, the actual energy density of the battery was considered to be very high.

4. Test Results

The batteries of Examples 1-13 and Comparative Examples 1-6 were separately prepared according to the above methods, and various performance parameters were measured. The results were shown in Table 1 below.

TABLE 1

| | Positive active material | Negative active material | (D90-D10)/D50 | Active specific surface area B of the negative electrode film (m$^2$/g) | Porosity P | 0.7 * P * (D90-D10)/D50 + B/3 | Actual energy density | Maximum charge rate | Cycle number |
|---|---|---|---|---|---|---|---|---|---|
| Example 1 | Lithium iron phosphate | Graphite | 0.3 | 2.0 | 20% | 0.71 | Very high | 2.8C | 3689 |
| Example 2 | Lithium iron phosphate | Graphite | 0.8 | 3.5 | 25% | 1.31 | Moderate | 2.9C | 3821 |
| Example 3 | Lithium iron phosphate | Graphite | 0 | 4.0 | 25% | 1.51 | Moderate | 3.1C | 4300 |
| Example 4 | Lithium iron phosphate | Graphite | 1 | 4.0 | 42% | 1.66 | Moderate | 3.2C | 4331 |
| Example 5 | Lithium iron phosphate | Graphite | 2 | 6.0 | 38% | 2.32 | Moderate | 3.2C | 4228 |
| Example 6 | Lithium iron phosphate | Graphite | 2 | 6.5 | 35% | 2.46 | Moderate | 3.2C | 4278 |
| Example 7 | Lithium iron phosphate | Graphite | 5 | 8.0 | 40% | 3.09 | Moderate | 3.2C | 4387 |
| Example 8 | Lithium iron phosphate | Graphite | 7 | 9.0 | 40% | 3.48 | Moderate | 3.2C | 4160 |
| Example 9 | Lithium iron phosphate | Graphite | 1.8 | 10.0 | 45% | 3.90 | Moderate | 3.2C | 3878 |
| Example 10 | Lithium iron phosphate | Graphite | 5.0 | 12.0 | 55% | 5.93 | Very low | 3.3C | 3769 |
| Example 11 | Lithium iron phosphate | Graphite | 8.0 | 13.0 | 58% | 7.58 | Very low | 3.2C | 3512 |
| Example 12 | Lithium iron phosphate | Hard carbon | 1.3 | 7.0 | 30% | 2.61 | Very low | 3.5C | 3395 |
| Example 13 | NCM811 | Graphite + silica monoxide (mass ratio 7:3) | 1.5 | 3.9 | 25% | 1.56 | Very high | 1.4C | 1069 |

TABLE 1-continued

|  | Positive active material | Negative active material | (D90–D10)/D50 | Active specific surface area B of the negative electrode film (m²/g) | Porosity P | 0.7 * P * (D90–D10)/D50 + B/3 | Actual energy density | Maximum charge rate | Cycle number |
|---|---|---|---|---|---|---|---|---|---|
| Comparative Example 1 | Lithium iron phosphate | Graphite | 0.3 | 1.5 | 22% | 0.55 | Moderate | 2.2C | 590 |
| Comparative Example 2 | Lithium iron phosphate | Graphite | 8.0 | 15.0 | 58% | 8.25 | Very low | 3.3C | 660 |
| Comparative Example 3 | Lithium iron phosphate | Hard carbon | 0.4 | 1.5 | 21% | 0.56 | Very low | 2.4C | 550 |
| Comparative Example 4 | Lithium iron phosphate | Hard carbon | 7.8 | 15.5 | 55% | 8.17 | Very low | 3.3C | 524 |
| Comparative Example 5 | NCM811 | Graphite + silica monoxide (mass ratio 7:3) | 0.4 | 1.4 | 21% | 0.53 | Very high | 1.1C | 120 |
| Comparative Example 6 | NCM811 | Graphite + silica monoxide (mass ratio 7:3) | 8.2 | 14.8 | 58% | 8.26 | Moderate | 1.5C | 109 |

First, as can be seen from the data of Examples 1-13 and Comparative Examples 1-6 that, when the negative electrode plate satisfies 0.6≤0.7×P×(D90–D10)/D50+B/3≤8.0, the battery has a good fast charging performance and cycle performance at the same time. When 0.7×P×(D90–D10)/D50+B/3<0.6 (for example, Comparative Example 1, 3, 5), or 0.7×P×(D90–D10)/D50+B/3>8 (for example, Comparative Examples 2, 4, 6), the battery cannot simultaneously satisfy the energy density, rate performance and cycle performance, and it is difficult to meet the actual use requirements. When 0.6≤0.7×P×(D90–D10)/D50+B/3≤8.0, both fast charging performance and cycle performance are acceptable; especially when 1.2≤0.7×P×(D90–D10)/D50+B/3≤4.0, for example, in Examples 2 to 9, the battery cycle performance exceeds 3,800 times, the maximum charge rate exceeds 2.8 C, and the energy density is moderate. Therefore, 1.2≤0.7×P×(D90–D10)/D50+B/3≤4.0 is the most preferable range, and it is possible to ensure that the battery has high cycle performance, excellent fast-charging performance, and good energy density at the same time.

In addition, it can be seen from the combination of various positive active materials and negative active materials of Examples 1-13 that the formula 0.7×P×(D90–D10)/D50+B/3 proposed by the present invention is widely applicable to each different combination of positive and negative active materials, for example, in Examples 1-11 and Comparative Examples 1-2, when graphite is used as the negative active material and lithium iron phosphate (LFP) is used as the positive electrode active material, the effect of 0.7×P×(D90–D10)/D50+B/3 on battery performance. It can be seen from the data of Examples 1-11 and Comparative Examples 1-2 that when the negative electrode plate satisfies 0.6≤0.7×P×(D90–D10)/D50+B/3≤8.0, the battery has good fast charging performance and cycle performance at the same time, especially when 1.2≤0.7×P×(D90–D10)/D50+B/3≤4.0, the battery performance is best. For another example, for the combination of NCM811 (positive electrode material) and graphite+silicon monoxide (negative electrode material), it can be seen from the comparison between Example 13 and Comparative Examples 5-6 that when the negative electrode plate satisfies 0.6≤4 0.7×P×(D90–D10)/D50+B/3≤8.0, the battery has good fast charging performance and cycle performance. Regarding the combination of lithium iron phosphate (positive electrode material) and hard carbon (negative electrode material), it can be seen from the comparison between Example 12 and Comparative Examples 3-4 that when the negative electrode plate satisfies 0.6≤0.7×P×(D90–D10)/D50+B/3≤8.0, the battery has good fast charging performance and cycle performance at the same time.

According to the data in Table 1, in order to improve the fast charging performance of the battery while maintaining the acceptable cycle performance, it is necessary to make 0.6≤0.7×P×(D90–D10)/D50+B/3≤8.0; if 1.2≤0.7×P×(D90–D10)/D50+B/3≤4.0, the battery has excellent fast-charging performance, cycle life and high energy density, and the overall performance of the battery is further improved.

It is also to be understood that the above-described embodiments may be modified and varied in accordance with the above teachings. Accordingly, the present application is not limited to the specific embodiments disclosed and described above, and modifications and variations of the present application are intended to be included within the scope of the claims of the present application. In addition, although some specific terminology is used in this specification, these terms are for convenience of illustration only and are not intended to limit the present application in any way.

What is claimed is:

1. A secondary battery comprising a negative electrode plate, wherein the negative electrode plate comprises a negative electrode current collector and a negative electrode film coated on at least one surface of the negative electrode current collector and containing a negative active material, wherein the negative electrode plate satisfies the following Formula I:

$$1.2 \leq 0.7 \times P \times (D90-D10)/D50 + B/3 \leq 4.0 \quad \text{(Formula I)}$$

wherein,

P refers to a porosity of the negative electrode film;

B refers to an active specific surface area of the negative electrode film, and the unit thereof is cm²/g;

D10 refers to a particle size corresponding to the cumulative volume percentage of the negative active material reaching 10%; D90 refers to a particle size corresponding to the cumulative volume percentage of the negative active material reaching 90%, and D50 refers to a particle size corresponding to the cumulative volume percentage of the negative active material reaching 50%, i.e. the median particle size of the volume distribution, the units of D10, D90, and D50 are all μm;

wherein the active specific surface area B of the negative electrode film is obtained as follows:

the negative electrode plate was used as a cathode, and a lithium metal sheet was used as an anode, and ferrocene having a concentration of 50 mmol/L was added to the electrolyte, then assembled into a button half battery; four parallel samples were scanned at sweep speeds of 0.1 mV/s, 0.3 mV/s, 0.5 mV/s, and 1 mV/s, respectively, to obtain cyclic voltammetry curves at different sweep speeds, which were extracted by using EC-Lab software to obtain the peak current ip of the cyclic voltammetry curve; taking the square root $\sqrt{v}$ of the sweep velocity v as the abscissa and the peak current ip as the ordinate, a linear graph of the cyclic volt-ampere curve ip vs. $\sqrt{v}$ was obtained, and then the slope K was obtained; according to the Randles-Sevick equation $i_p=2.69\times10^5 n^{3/2} Ac\sqrt{D}\sqrt{v}$, as can be seen that the slope was $K=2.69\times10^5 n^{3/2} Ac\sqrt{D}$, where n was the number of electron transfer, which was related to the molecular type of the probe; here, n was given a value of 1, c was the concentration of ferrocene, and here c was given a value of 50 mmol/L, and D was the diffusion coefficient of ferrocene, and here D was given a value of $2.1\times10^{-6}$ cm$^2$/s; thus the active surface area of the negative electrode plate was $A=K/(2.69\times10^5 n^{3/2} c\sqrt{D})$; then the ratio of the active surface area A of the negative electrode film to the weight m of the negative electrode film was calculated, which represented the active specific surface area B of the negative electrode film;

wherein the negative active material has a specific surface area of from 1.1 m$^2$/g to 2.9 m$^2$/g;

wherein the active specific surface area B of the negative electrode film satisfies 3.5 cm$^2$/g≤B≤10 cm$^2$/g; and wherein the negative active material is graphite material.

2. The secondary battery according to claim 1, further comprising a positive electrode plate which contains a positive active material, wherein the positive active material comprises lithium iron phosphate.

3. The secondary battery according to claim 1, wherein the porosity P of the negative electrode film satisfies 20%≤P≤60%.

4. The secondary battery according to claim 1, wherein the porosity P of the negative electrode film satisfies 25%≤P≤45%.

5. The secondary battery according to claim 1, wherein the active specific surface area B of the negative electrode film satisfies 4 cm$^2$/g≤B≤10 cm$^2$/g.

6. The secondary battery according to claim 1, wherein the negative active material satisfies: 10 μm≤D90≤60 μm; and/or
4 μm≤D50≤20 μm; and/or
1 μm≤D10≤15 μm.

7. The secondary battery according to claim 1, wherein the negative active material satisfies: 15 μm≤D90≤40 μm; and/or
5 μm≤D50≤14 μm; and/or
3 μm≤D10≤10 μm.

8. The secondary battery according to claim 1, wherein the negative active material satisfies 0.3≤(D90−D10)/D50≤8.

9. The secondary battery according to claim 1, wherein the negative active material satisfies 0.8≤(D90−D10)/D50≤3.

10. The secondary battery according to claim 1, wherein a packed density PD of the negative electrode film satisfies 0.8 g/cm$^3$≤PD≤2.0 g/cm$^3$.

11. The secondary battery according to claim 10, wherein the packed density PD of the negative electrode film satisfies 1.0 g/cm$^3$≤PD≤1.8 g/cm$^3$.

12. The secondary battery according to claim 1, wherein a coating weight CW per unit area of the negative electrode film satisfies 2 mg/cm$^2$≤CW≤13 mg/cm$^2$.

13. The secondary battery according to claim 12, wherein the coating weight CW per unit area of the negative electrode film satisfies 5 mg/cm$^2$≤CW≤10 mg/cm$^2$.

* * * * *